United States Patent
Hansen et al.

(10) Patent No.: US 6,848,493 B1
(45) Date of Patent: Feb. 1, 2005

(54) WINDOW SHADE WITH BI-DIRECTIONALLY OPERATING ACTUATING ELEMENTS

(75) Inventors: Melf Hansen, Baltmannsweiler (DE); Herbert Walter, Ebersbach (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 10/640,486

(22) Filed: Aug. 13, 2003

(30) Foreign Application Priority Data

Aug. 14, 2002 (DE) .......................................... 102 37 231

(51) Int. Cl.[7] .................................................. B60J 3/00
(52) U.S. Cl. .................. 160/370.22; 160/265; 160/274; 296/97.8
(58) Field of Search ............................. 160/370.22, 310, 160/23.1, 265, 274; 296/97.7, 97.8, 37.16

(56) References Cited

U.S. PATENT DOCUMENTS

| | | | | |
|---|---|---|---|---|
| 5,201,810 A | * | 4/1993 | Ojima et al. ................. | 160/265 |
| 5,560,668 A | * | 10/1996 | Li ............................... | 296/97.8 |
| 6,086,133 A | * | 7/2000 | Alonso ........................ | 296/97.8 |
| 6,095,231 A | * | 8/2000 | Hahn ....................... | 160/370.22 |
| 6,520,239 B2 | * | 2/2003 | Schlecht et al. ............ | 160/120 |
| 6,547,307 B2 | * | 4/2003 | Schlecht et al. ........... | 296/97.4 |
| 6,598,929 B2 | * | 7/2003 | Schlecht et al. ........... | 296/97.4 |
| 6,695,381 B2 | * | 2/2004 | Schlecht et al. ........... | 296/97.4 |
| 6,739,375 B2 | * | 5/2004 | Schlecht et al. ........ | 160/370.22 |

FOREIGN PATENT DOCUMENTS

| | | |
|---|---|---|
| DE | 3345503 A | 6/1985 |
| DE | 19943243 A | 4/2001 |
| EP | 1211111 A | 6/2002 |

OTHER PUBLICATIONS

International Search Report (Oct. 10, 2003).

* cited by examiner

*Primary Examiner*—David Purol
(74) *Attorney, Agent, or Firm*—Leydig, Voit & Mayer, Ltd.

(57) ABSTRACT

A window shade for motor vehicles has a pull rod arrangement which, by means of actuating elements running through the guide rails, is moved in a positive manner away from the winding shaft as toward it. To this end, a positively acting coupling is provided between the pull rod arrangement and the respective actuating element.

24 Claims, 7 Drawing Sheets

WINDOW SHADE WITH BI-DIRECTIONALLY OPERATING ACTUATING ELEMENTS

FIELD OF THE INVENTION

The present invention relates generally to window shades, and more particularly, to power operated window shades for motor vehicles.

BACKGROUND OF THE INVENTION

It is known to use window shades for regulating the entry of light into the interior of motor vehicles. Such window shades customarily have a winding shaft, which is arranged in a concealed manner, and on which an edge of the window shade web is fastened. The window shade web is prestressed by a spring drive in a direction for winding up the window shade web. The window shade web is extended through a slit provided in the window sill, the upper roof edge, or the rear window shelf.

A pull rod, which is guided at an end in at least one guide rail, is provided for maintaining the window shade web taut. If two guide rails are used, the pull rod is guided at both ends, generally with a telescope-like extension or shortening of the pull rod during its retraction and extension, since the windows of motor vehicles are not exactly rectangular.

The displacement of the pull rod along the guide rods against the effect of the spring drive takes place with the aid of linearly-shaped flexible actuating elements. Such flexible actuating elements are designed similar to a Bowden cable and consist of a cylindrical core or a cylindrical core element, which supports a helically extending rib on its exterior. A toothed rack is created in this way which is provided with teeth all around. The exterior diameter of the actuating element is designed such that it can be guided, substantially in a buckle-like manner, in the groove of the guide rail without the actuating element being able to come out of the slit of the guide groove. In arrangements known up to now, there is a flush connection between the respective end of the actuating element and the guide body of the pull rod running in the guide groove. This flush connection can only transfer pressure forces.

A gear motor is provided for extension and retraction of the window shade, whose output shaft supports a gear wheel which meshes with the actuating element. Displacement of the actuating element causes the window shade web to be pulled off the winding shaft to extend the window shade web. In the course of that movement, the window shade web is maintained taut by the force of the spring motor. Retraction of the window shade takes place by changing the direction of rotation, with the electric motor pulling the actuating element back along the guide groove in order to allow the pull rod to move in the direction toward the winding shaft.

With an aim of utilizing the smallest possible space for the winding shaft, the winding shaft typically has a small exterior diameter. Accordingly, a great number of revolutions are required for rolling up the window shade web in its entirety. Even when using a spring drive with a relatively long spring travel, the winding torque at the end of the retraction differs considerably from that at the start. Added to this is that, with the window shade completely rolled up, the effective diameter, and therefore the lever arm, is large. With an acceptable tension in the shade web when it is completely extended, the force pulling the pull rod back becomes comparatively weak toward the end of the retraction movement.

Under unfavorable conditions the pull rod can become stuck before it has been completely retracted. The seizing can be aided by small clamping forces of the guide bodies in the guide rail. Because of the change in width, the guide bodies must be prestressed to assure freedom from rattling, and as a result, are subjected to considerable friction in the guide rail.

OBJECTS AND SUMMARY OF THE INVENTION

Based on the foregoing, it is the object of the present invention to provide a window shade for motor vehicles, wherein the actuating elements of the pull rod can transmit pulling, as well as pushing forces to the pull rod.

With the novel window shade, the window shade web is wound up by means of a winding shaft, and preferably of a spring drive, on the winding shaft. A pull rod arrangement is attached to the edge of the window shade web remote from the winding shaft, from which a guide body moves in at least one guide groove of a guide rail. The guide body and the actuating element are each provided with coupling halves, which permit at least one engagement. Within the meaning of the invention, such a connection is a snap-in connection, which is closed once it is operated.

An advantage of this arrangement is that it is possible when mounting the window shade to install the pull rod arrangement and the actuating elements separately from each other. The coupling between the actuating element and the associated guide body is closed, or snapped together, only after the complete installation which, depending on the design, takes place automatically in the course of the first operation, or can be performed by a separate assembly step.

However, it also is possible to design the coupling in such a way that it can be connected and disconnected during operation as often as desired. This embodiment is of advantage if the retracted end position of the actuating element does not match the structural end position of the pull rod arrangement. Such conditions can occur if the actuating element is simultaneously needed for performing a further function, for example the opening and closing of the flaps for the slit through which the window shade web is pulled out. Further examples are the possibility of operating another window shade web, which is rolled up on a separate winding shaft, by means of the same actuating element. Such a window shade for motor vehicles is know from DE 100 57 763 A, the disclosure of which is incorporated herein by reference.

While the coupling to be connected only once is a snap-in connection, for example, the arrangement for multiple coupling consists of two coupling halves, which in the broadest sense are hook-shaped. In order to facilitate coupling and uncoupling, one of the coupling halves may be longitudinally displaceable in the guide rail, while the other coupling half can be moved transversely.

A crank mechanism is provided in order to let the coupling engage and disengage in the operationally correct position. The crank mechanism can be constituted by a control shoulder, which for example is the rim of an opening additionally formed in the guide groove.

The force required to engage and disengage the coupling halves can be obtained from the actuating force. To this end, the faces on the coupling havles which can be brought into engagement with each other are approximately designed to extend obliquely. A fixed control face also can be used for the disengagement. The last mentioned embodiment prevents a force acting continuously in the disengagement direction, which increases friction and wear on the guide rails.

If the arrangement is made in such a way that the coupling can be operationally engaged and disengaged as often as desired, the actuating element can also be used to perform a further function after disengagement by means of overtravel. For this purpose the other end of the actuating element also is provided with a corresponding coupling half, so that the two ends of the actuating element are identically embodied. The spring motor in the winding shaft can be comparatively very weak because of the special pull-and-push resistant coupling with the actuating element.

Other objects and advantages of the invention will become apparent upon reading the following detailed description and upon reference to the drawings, in which:

Figure 1:
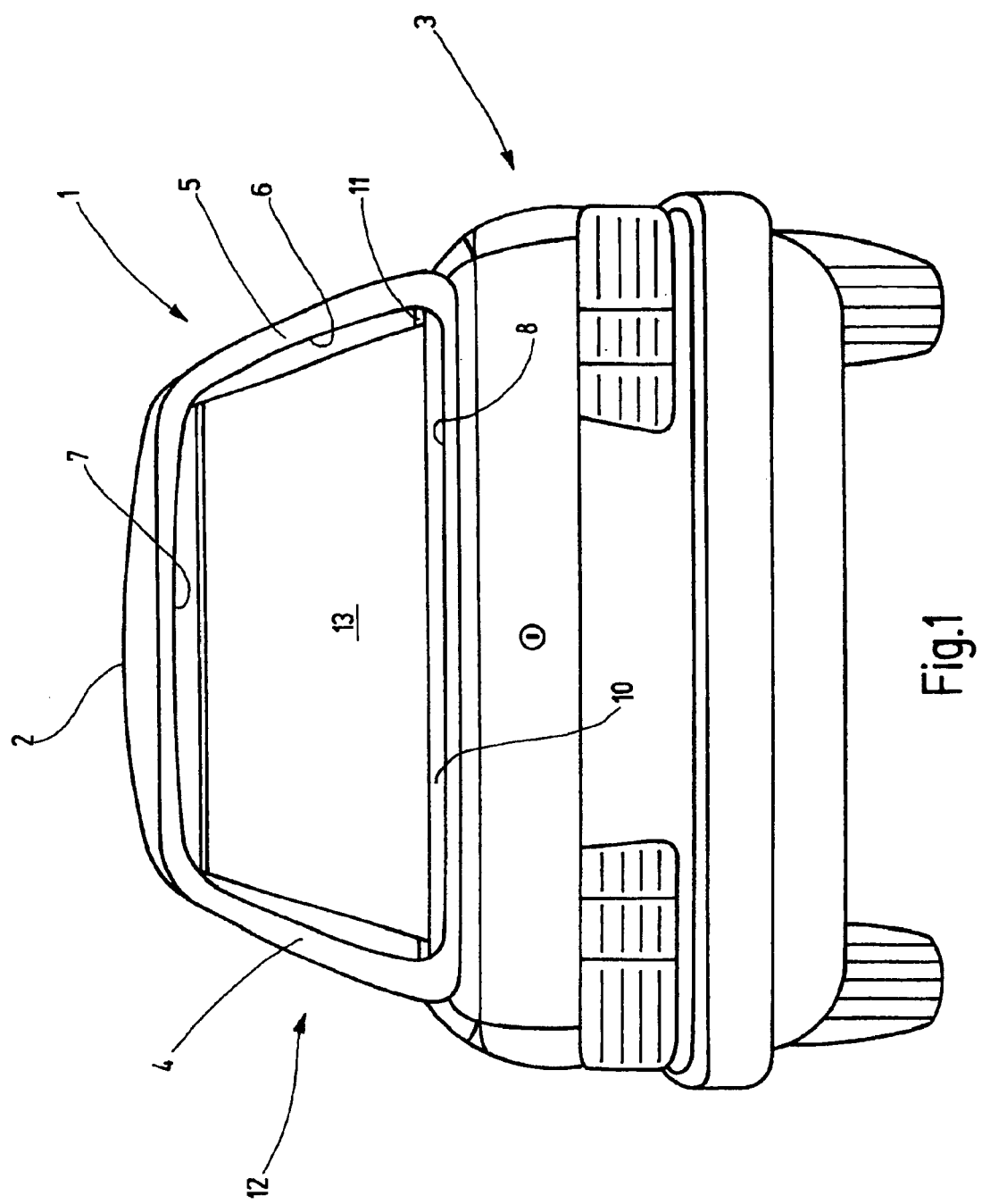
FIG. 1 is a rear-view of an automobile having a window shade in accordance with the invention.

While the invention is susceptible to various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE DRAWINGS

Referring more particularly to the drawings, there is shown a illustrative passenger car having a window shade in accordance with the invention. The illustrated passenger car 1 has a roof 2, a trunk 3, as well as two C-pillars 4 and 5. A rear window opening 6 is located between the two C-pillars 4 and 5, which is bordered at the top by the rear roof edge 7 and on the bottom by the window ledge 8. A rear window glass 9 is seated in the rear window opening and glued in by means of window rubber strips in a known manner.

A shelf 10 extending horizontally between the lower window edge 8 and the rear seat back, not visible in the drawing, is located in the interior of the passenger car in front of the inside of the rear window glass 9. A straight outlet slit 11 extends in the shelf 10. The outlet slit 11 is part of a rear window shade 12, whose basic structure is schematically depicted in FIG. 1.

Figure 2:
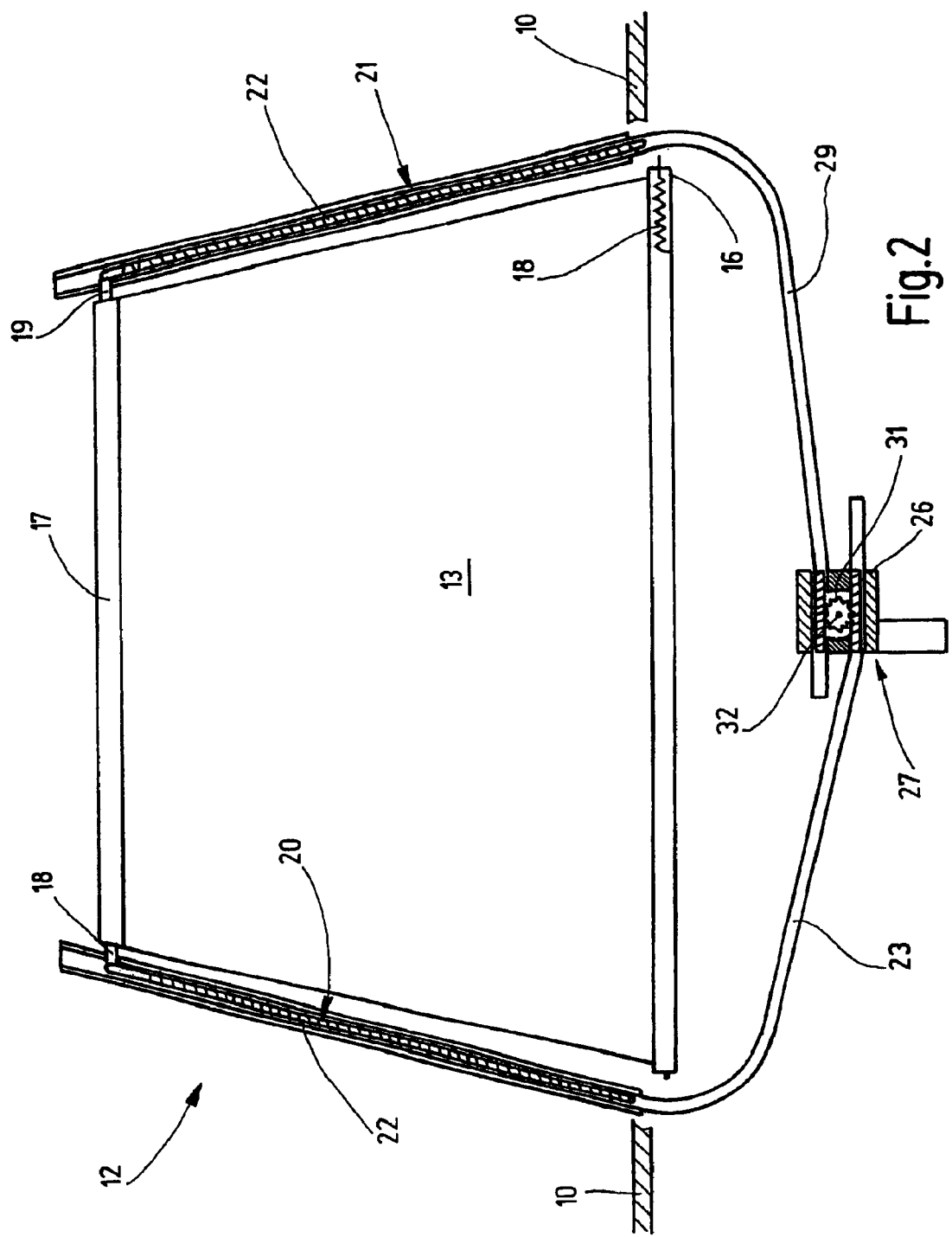
FIG. 2 is a partially diagrammatic section of the basic structure of the illustrated window shade.

The rear window shade 12 includes a window shade web 13, which is shown in an extended state in FIG. 1. It has a trapezoidal shape in order to shade the rear window, whose shape is trapezoidal. A winding shaft 16 is rotatably seated underneath the shelf 10 as shown in FIG. 2. One edge of the window shade web 13 is fastened on the winding shaft 16. Its other edge remote from the winding shaft 16 is connected with a pull rod arrangement 17. The winding shaft 16 is pre-tensed by means of a spring motor 18 inside the winding shaft 16 in a direction for winding up the window shade web 13.

Two guide elements 19, which can be substantially displaced in a telescope-like manner, are provided in the pull rod arrangement 17. The telescope-like displaceable guide elements 19 run in two guide rails 20, 21, which extend inside the vehicle on the other side of the lateral edges of the window 6, so that they cannot be seen from the outside.

Actuating elements 22 run inside the two guide rails 20, 21. The guide rails 20, 21 continue below the shelf in guide tubes 23, 24, through which the actuating elements extend for connection with a gear 26 of a gear motor 27. The actuating elements 22 extend through the guide rails 20, or 21, as well as the connecting tubes 23, 24.

Figure 3:
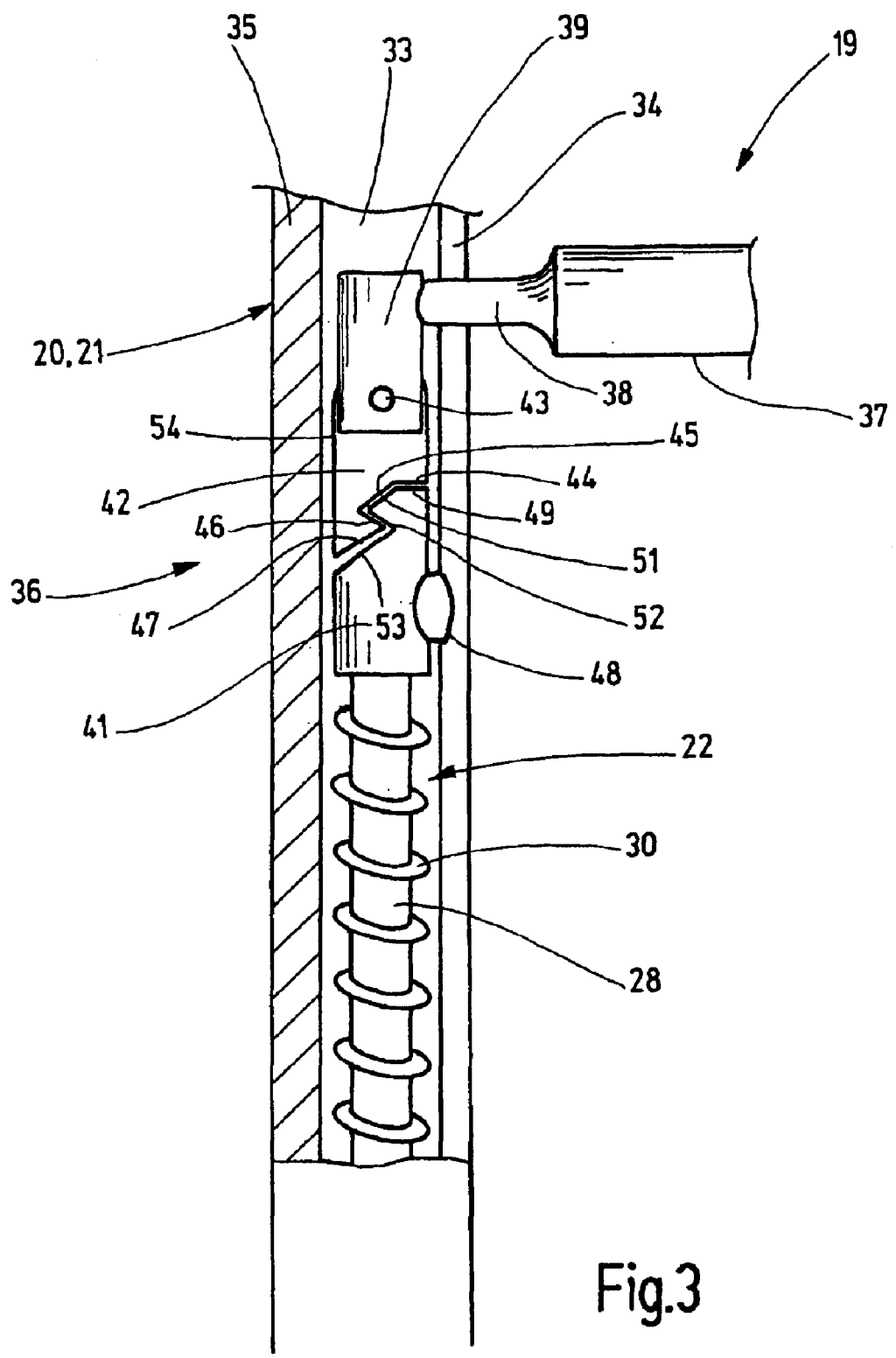
FIG. 3 is an enlarged fragmentary section of the coupling between the actuating element and pull rod arrangement of the window shade shown in FIG. 2.

The actuating elements 22 are linearly-shaped flexible elements similar to Bowden cables which, as shown in the enlarged representation in FIG. 3, include a cylindrical core element 29 with a helically extending rib 30 which defines a toothed rack with oblique teeth. With the aid of the rib 30, the actuating elements 22 mesh with an output gear wheel 31, indicated in dashed lines, which is fixed on an output shaft 32 of the gear motor 27.

The two actuating elements 22 extend tangentially past the gear wheel 31 on opposite sides. By means of such arrangement, they are the actuating elements which can be synchronously moved in opposite directions.

The two guide rails 20, 21, as best depicted in FIG. 3, are in the form of a tube with a longitudinal guide groove for slit 33 which opens toward a side thereof. A guide rail has a back 35 on an opposite side. The guide rails may be formed with appropriate fastening flanges to facilitate mounting within the motor vehicle.

Each actuating element 22 is connected with the pull rod arrangement 17 by means of a pull-and-push resistant-acting coupling 36. The pull rod arrangement 17 includes the guide element 19, which has a cylindrical shank 37, which can be displaced in a telescope-like manner in a center piece of the pull rod arrangement. At its end adjoining the respective guide rail 20, 21, the shank 37 makes a transition into a slim neck element 38, which projects through the slit 34 into the guide groove 33. On an inside-located end, the neck element 38 has a guide body 39, whose cross-sectional shape is matched to the cross-section of the guide groove 33. The guide body 39 is longitudinally displaceable in the guide groove 33, but cannot be rotated around an axis extending parallel with the longitudinal axis of the shank 37.

In accordance with the invention, the coupling 36 comprises a multi-part selectively disengageable and engageable construction which-enables positive driving movement for both extending and retracting the window shade. The illustrated coupling 36 consists of two coupling halves 41, 42. The coupling half 42 is a plate-shaped element, which is pivotably seated on the guide piece 39. The coupling half 42 in this case is pivotally supported by means of a hinged bolt 43 extending through corresponding bores in the guide piece 39 and in the coupling half 42. The shaft of the hinge formed by the bolt 43 extends at right angles to the longitudinal axis of the shank 37. The guide piece 39 preferably is formed with a transverse slit or groove on a side facing the actuating element 22 for defining a forked mouth within which the coupling half is supported.

On its free end remote from the guide piece 39, the coupling half 42 has a hook shape. The mouth of the hook opens in a direction toward the slit 34. In detail, the respective end of the coupling half 42 is composed of the following faces: a first face 44 extends parallel with the longitudinal axis of the shank 37. It starts at the side of the coupling half 42 next to the slit 34 and extends approximately one-third the distance into the guide groove 33. A face 45 adjoins the face 44 and extends at an angle of approximately 45° in the direction toward the rear wall 35, or the actuating element 22. On its end adjoining the rear wall 35, the face 45 makes a transition into a face 46 extending in the direction toward the slit 34. Finally, a face 47 adjoins the face 46 and leads back obliquely to the rear wall 35. The faces 44, 45, 46 and 47 each extend vertically on the same plane.

The coupling half 41 is a type of bushing which is clamped in place on the core element 28. A tongue 48 is crimped to one circumferential side of the coupling half 41 and extends into the slit 34 to prevent it from rotating.

At its end remote from the actuating element 22, the coupling half 41 is shaped to complement the coupling half 42. This means that its front end located the farthest away forms a face 49 located parallel opposite the face 44. The front face 49 makes a transition into a face 51 extending parallel with respect to the face 45. A face 52 adjoins the face 51, which extends parallel with respect to the face 46, and finally a face 53 is parallel with the face 47. The faces 49, 51, 52 and 53 extend vertically with respect to the drawing plane.

The dimensions in the transverse direction of the tongue-shaped coupling half 42 are such that its side 54 extends at a short distance from that part of the guide groove 33 which adjoins the back 35. As a result of this arrangement, the coupling half 42 cannot come free of its hooked connection with the coupling half 41 because the play between the flank 54 and the wall of the guide groove 33 is less than the required lift for unhooking.

The functioning of the represent arrangement is as follows:

Assuming the coupling 36 is in the engaged state, as depicted in FIG. 3, if the window shade 12 is to be extended further, the gear motor 27 is put into operation in such a way that the actuating elements 22 are pushed forward in the two guide rails 20, 21 in the direction toward the upper end of the respective guide rail 20, 21. In the course of this, a pushing or pressure force is transmitted from the coupling half 41 to the coupling half 42. This pushing force causes the two faces 44, 49 to meet each other flush so that no tilting force can be transmitted to the coupling half 42, but if one does, it is at most a tilting force which causes the tip between the faces 46, 47 to penetrate deeper into the mouth between the faces 52, 53 because the two faces 44, 49, for example, only generate a pushing force along the side of the hinged bolt 43. The pushing force exerted by the actuating element 22 is exerted directly on the pull rod arrangement 17, so that further material of the window shade web 13 is unwound from the winding shaft 16 against the effect of the spring drive 18.

For retracting the window shade 12, the motor 27 is put into operation in the opposite direction of rotation. By means of this, the actuating elements 22 are pulled back along the guide rails 20, 21. The pull rod arrangement 17 will follow to the same extent to which the actuating elements 22 retreat since a pulling force is continuously exerted by the spring drive 18, which winds up the window shade web 13.

If the force exerted by the spring drive 18 on the pull rod arrangement 17 should not be sufficient, the respective actuating element transmits a pulling force to the pull rod arrangement. This force transmission is provided via the hooked-together coupling halves 41, 42 of the coupling 35. For transmitting a pulling force, an appropriate pulling force is transmitted via the faces 46, 52 so that the respective end of the pull rod arrangement 17 is forced to follow the retreat of the actuating element 22. Since the two faces 46, 52 are oriented obliquely in respect to the longitudinal extension of the guide rail 20, 21, a force component is created which tries to separate the two coupling halves 41 and 42 from each other. However, no separation can take place because the coupling half 42 is supported by its lateral flank 54 on the wall of the guide groove 33, while on the other hand the coupling half 41 is supported on the other wall next to the slit 34.

Figure 4:
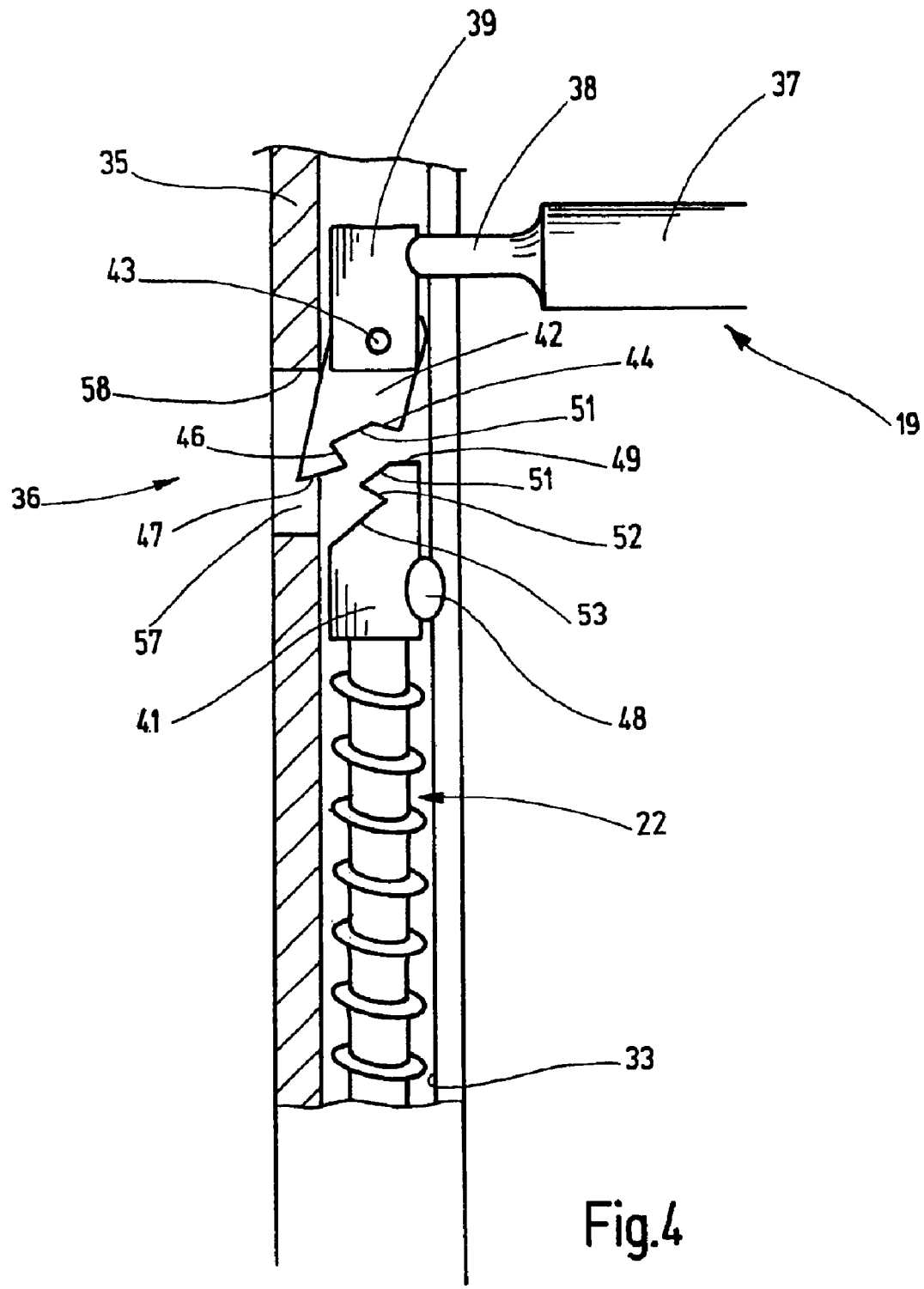
FIG. 4 is a fragmentary section, similar to FIG. 3, showing the coupling between the actuating element and pull rod arrangement in an disengaged state.

A disengagement of the coupling 36 is only possible at a location where, in the course of the guide rail 20, 21 a slit-like opening 7 is provided in the rear wall 35, as shown in FIG. 4. The force acting to achieve a separation, which is effective at the faces 46, 52 in a direction transversely to the longitudinal extension of the guide rail 21, can pivot the upper coupling half 42 in a direction away from the slit 34, as indicated, so that the two coupling halves 41 and 42 come out of engagement.

Starting at this point, the actuating element 22 alone will continue in its travel, while the pull rod arrangement 17 will stop at this point. Thus, the actuating element 22 can perform a greater movement stroke than the pull rod arrangement 17. Because of this it is possible to use the other end of the actuating element 22 for performing further functions or actuations, for example to close a flap, not represented, for the slit, or to extend a second window shade web, as explained in the above referenced patent application.

The renewed engagement of the coupling 36 takes place in that, starting from the representation in FIG. 4, the actuating device 22 is moved upward. In the course of this movement the face 49 will come into contact with the corner at which the face 44 terminates in the direction toward the slit 34. This creates a pushing force, and furthermore a torque around the hinged bolt 43. The two effects together result in the pull rod arrangement being lifted, and a shoulder 58 of the opening 57, located in the direction of movement, starting to continuously pivot back the upper, in respect to FIG. 4, coupling half in a counterclockwise direction until finally, after the coupling half 42 has left the opening 57, the configuration in accordance with FIG. 3 has been reached again.

In the above described embodiment the faces 46, 52 of the coupling halves 41, 42 are designed in such a way that a disengaging force acts continuously when the actuating element 22 acts by pulling on the guide element 19 of the pull rod arrangement 17. Depending on the selection of the angles of the faces the frictional engagement of the surfaces, and the extent of the pulling force, the separating force between the coupling halves 41, 42 can be determined and controlled. If the separating force, which tends to push the coupling half 42 against the rear wall 35 of the guide rail is not desired, an alternative embodiment, as depicted in FIGS. 5 and 6, can be used.

Figure 5:
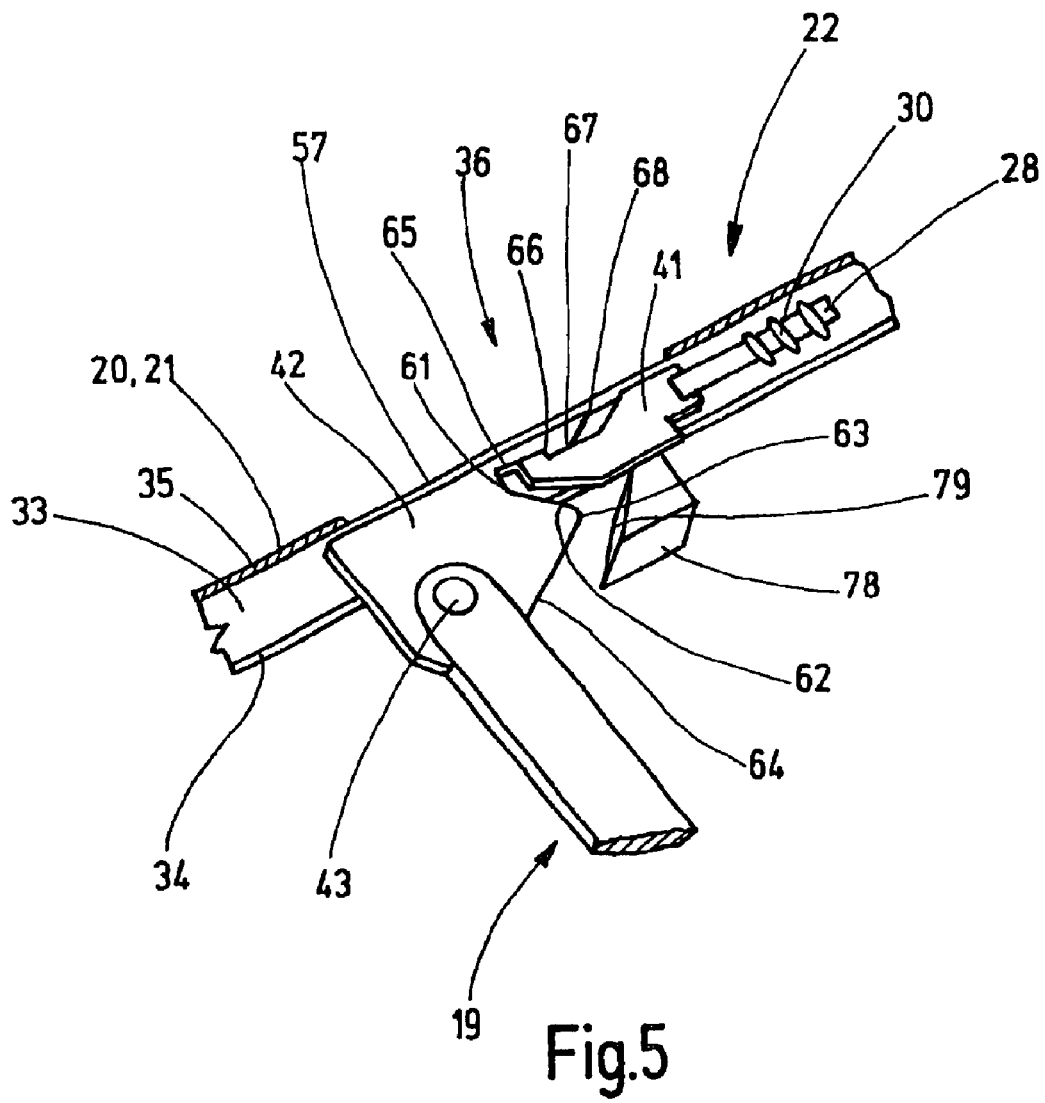
FIG. 5 is a schematic perspective of an alternative embodiment of coupling between the actuating element and pull rod arrangement of a window shade in accordance with the invention.
Figure 6:
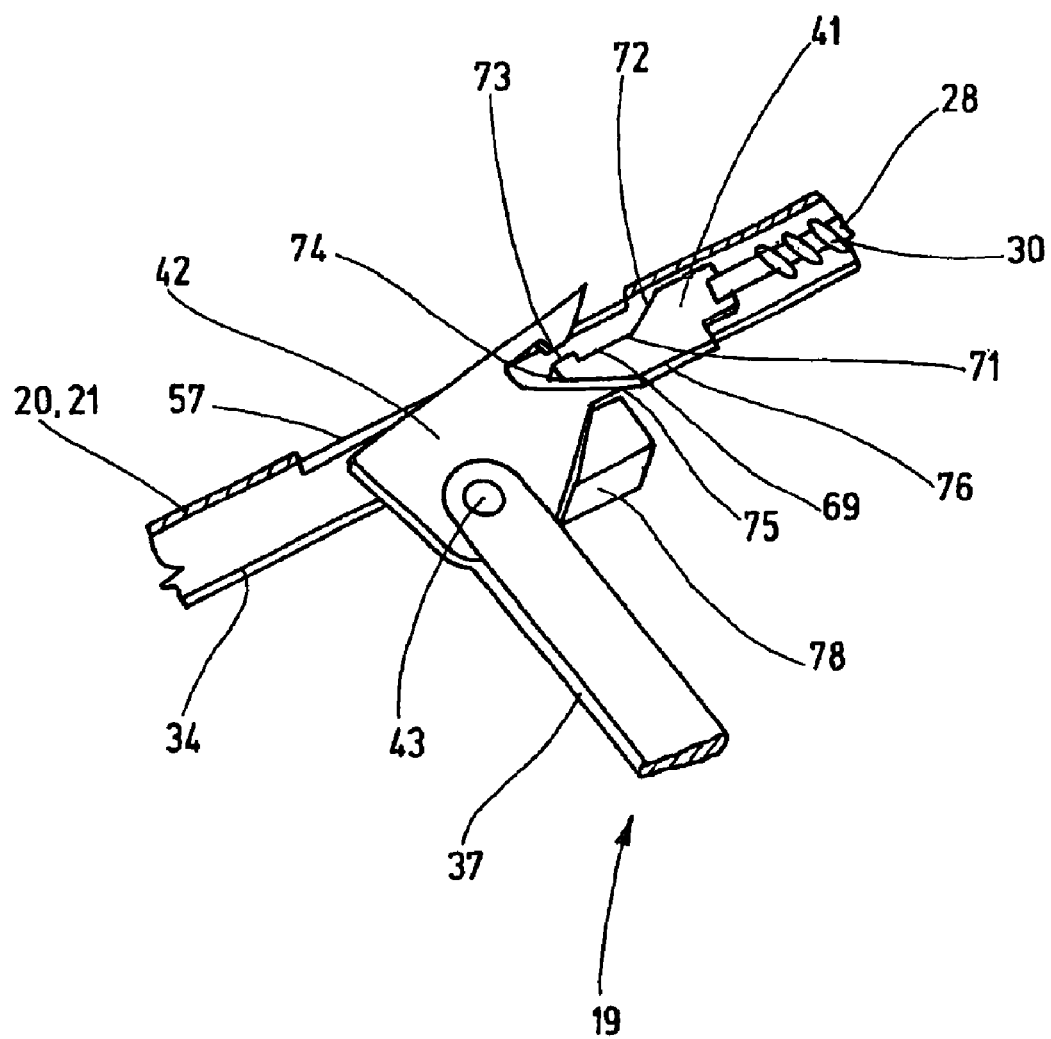
FIG. 6 is a schematic perspective, similar to FIG. 5, but showing the coupling in a disengaged state.

The structure of the exemplary embodiment in accordance with FIGS. 5 and 6 is similar to the one in the previously described exemplary embodiment so that elements which functionally correspond with each other are provided with the same reference symbols. Accordingly, the following explanation is limited to the essential differences.

In accordance with the exemplary embodiment shown in FIG. 5, the coupling half 42 is hinged directly to the guide element 19 by means of the hinged bolt 43. The guide piece 39, which previously was used as a connection between the guide elements 19 and the coupling half 42, is omitted.

The coupling half 42 in this case is plate-shaped and, at its end facing the actuating element 22 has a hook-shaped configuration opening in the direction toward the slit 34.

In the pushing direction, the hook mount is bordered by a face 61 extending through the actuating element 28 at right angles to the actuating axis. In the direction toward the slit side of the guide rail 20, 21, the face 61 makes a transition into an oblique face 62 which projects out of the guide slit 34. At a tip 63 located next to the slit 34, the face 62 meets a face 64, which extends in the direction toward the guide element 19. The exact configuration can be seen in the representation of FIG. 5.

At the end located on the inside, i.e. the end adjacent the back 35, the face 61 makes a transition into a face 65 which extends parallel with the back 35. Between them, the faces 61, 65 form a right angle. The face 65 terminates at a face 66, which extends parallel with the face 61, but is only approximately half as long. The face 67 also extends parallel with the face 65 and starts at the face 66, while it terminates at a face 68, which points at an acute angle in the direction toward the actuating element 28, or the back 35.

The coupling half 41 is fastened rigidly and immovably as before on the actuating element 28 in a complementary manner. It also forms a hook, whose hook mouth is bordered by the faces 69, 71, and 72. The face 69 extends at right angles in respect to the longitudinal axis of the guide rails 20, 21, the face 71 in the longitudinal direction of the latter, and the face 72 at an acute angle. The hook mouth delimited in this way opens in the direction toward the back 35 of the guide rail 20, or 21. The coupling half 41 is bordered toward the exterior by faces 73, 74, 75 and 76. Of these, the face 7 adjoins the face 69 and extends parallel with the face 71. The face 74 starts at the face 73 and lies parallel with and at a distance from the face 69. The face 75 adjoins the face 74 at a bend located toward the slit 34 and extends at an acute angle in respect to the longitudinal axis of the guide rails 20, 21. Finally, the face 76, which adjoins the face 75, lies parallel with the back 35 and extends outside of the slit 34.

Finally, a stop 78 with an obliquely extending control face 79 is provided for controlling the disengagement process. In a manner to be described further down below, the control face 79 acts together with the face 64. The stationary control face 79 also is located at the height of the slit-like opening 57. The stop 78 is attached to the automobile body next to the slit 34.

The functioning of the arrangement in accordance with FIGS. 5 and 6 is as follows:

Let it be initially assumed that, as represented in FIG. 5, the coupling 36 is in the engaged state. In this state, the face 66 is in a flush and smooth contact with the face 69 when the pull rod arrangement 17 is to be pulled by means of the actuating element 28. Since the two faces 66, 69 extend at right angles with respect to the longitudinal axis of the guide rails 20, 21, no force component is created by the faces which would tend to separate the faces 66, 69 from each other. Only the force acting on the coupling half 42 tangentially with respect to the hinged bolt 43 causes a small torque in a clockwise direction.

If, however, the pull rod arrangement 17 should be pulled against the front end, or front face 74 by the spring drive, which is seated in the winding shaft and tends to roll up the window shade web 13, the face 74 rests flush against the face 61 of the coupling half 42. Since these two faces, which are in engagement with each other, also extend at right angles in respect to the longitudinal axis of the guide rails 20, 21, no separating force component is created by this. Moreover, in this state the faces 68, 72 are at a distance from each other so no force tending to pivot the coupling half 42 can be created.

If in the course of the window shade retraction the movement becomes stiff, the coupling half 41 pulls the coupling half 42 in the direction toward the window shade shaft, wherein the hook faces 66, 69 are in contact with each other as shown. The coupling half 42 is simultaneously used as a guide member for the guide element 19 by reason of it extending outwardly through the slit 34, as indicated. Different from the previous exemplary embodiment, the hinge defined by the hinged bolt 43 is located outside of the guide rails 20, 21.

In the course of the movement of the pull rod arrangement 17, and therefore of the guide element 19, the coupling half 41 will move past the stop 78. In the course of further movement, the tip 63 of the coupling half 41 will impact on the control face 79. The special alignment of the control face 79 represented in FIG. 5 forces a pivoting movement of the coupling half 42 in a counterclockwise direction in relation to the representation. The coupling half 41, which is rigidly fastened on the actuating element 28, cannot follow this deflection movement. Because of this, the two coupling halves 41, 42 are separated from each other, as in FIG. 6. As indicated, in the course of the pivoting movement the coupling half 42 will pass in a rearward direction through the elongated slit 57. The faces 66, 69 come out of engagement so that the actuating element 28, together with the coupling half 41, can continue to move toward the right in the movement direction without taking the coupling half 42 along any farther. Otherwise, the position of the faces and the design of the coupling half 42 is such that the coupling halves 41, 42 cannot come out of engagement with each other at any other location than in the elongated opening 57.

If, however, it is intended to extend the window shade web 13, the coupling half 41, coming from the right as viewed in FIG. 6, approaches the coupling half 42 stopped at the stop 78. In the course of the movement the corner between the two faces 74, 75 will meet the face 62, which is inclined in such a way that a force component is created, which tends to rotate the coupling half 42 in a clockwise direction around the hinged bolt 43. At the same time the pull rod arrangement 17, together with the coupling half 42, is pushed away from the stop 78, so that the control face 79 of the latter no longer interferes with the pivoting movement of the coupling half 42.

The pivoting movement of the coupling half 42 is terminated as soon as the face 74 rests flush against the face 61. Since these faces extend at right angles with respect to the longitudinal extension of the guide rails 20, 21, practically no further pivoting force component, which would be caused by the shape of the faces, is generated. Only a small force component remains, the reason for which lies in that the force vector occurring in the course of pulling or pushing against the two coupling halves 41, 42 extends at a radial distance from the hinged bolt 43.

These remaining force components also can be avoided if, as represented in the previous embodiment, the hinged bolt 43 is relocated into the guide rails 20, 21, namely on the axis of the application of the force between the two coupling halves 41, 42. Alternatively, it would be possible to design the face pairs 61, 74 or 66, 69 so they extend obliquely and create a force component which counteracts the torque around the hinged bolt 43.

From the foregoing embodiments, it can be seen that the couplings can be engaged and disengaged as often as desired each time the coupling 36 passes a predetermined location, such as the shoulder 58, in the respective direction.

Figure 7:
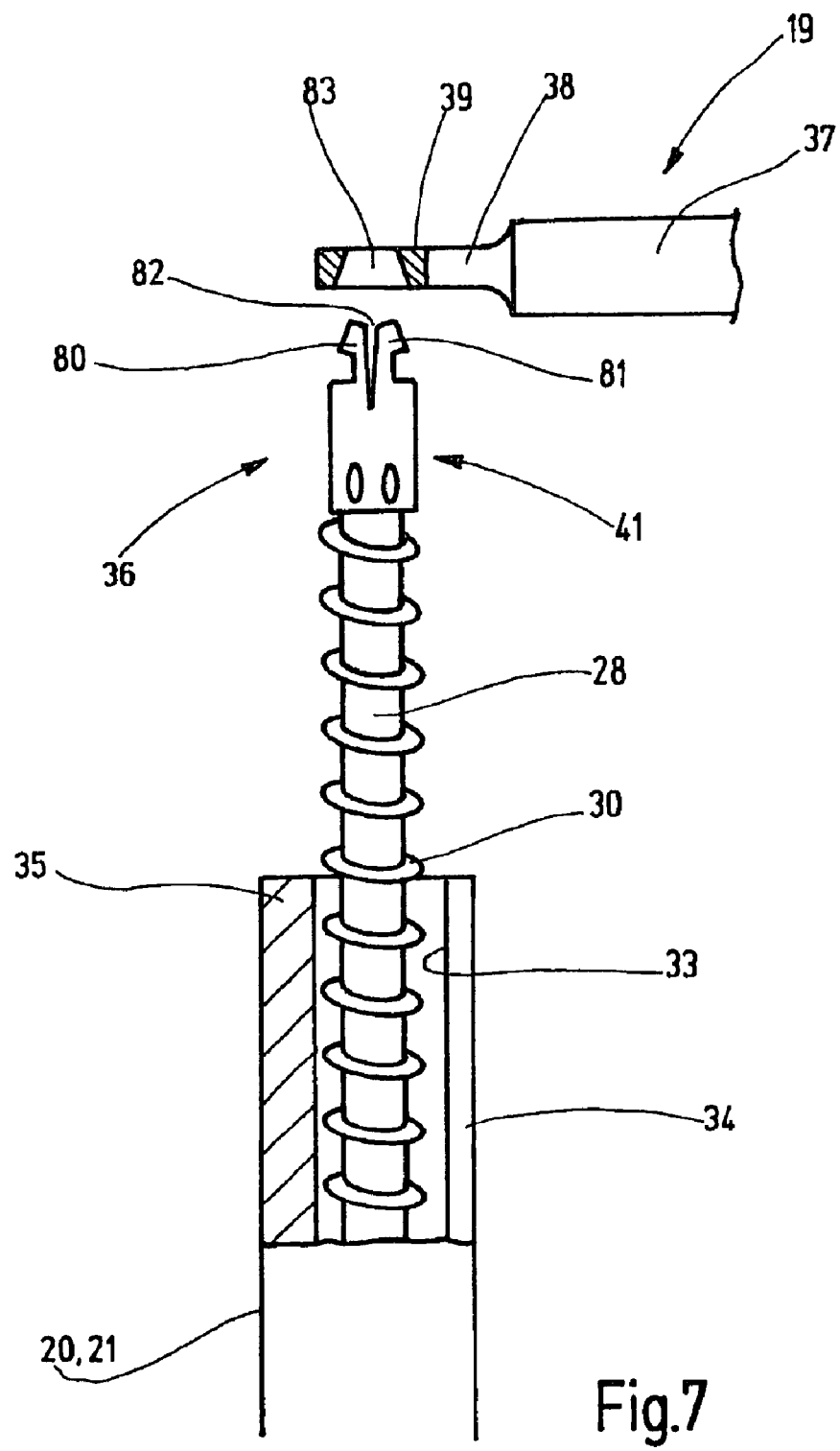
FIG. 7 is a schematic of still a further exemplary embodiment of coupling according to the invention.

If the actuating element 22 does not need to perform overtravel, but the dependable return of the pull rod arrangement 17 into the initial or rest position is nevertheless desired, it is possible to use the coupling depicted in FIG. 7. This coupling is a snap-in connection, which can be operatively engaged once, but cannot be disengaged afterwards.

On its end remote from the core element 28, the lower coupling half 41 is provided with two hooks 80 and 81, which are separated from each other by a slit 82. The guide piece 39 is in the shape of a ring with a bore 83 which extends through it and widens in a funnel-shape in the direction toward the coupling half 41. Thus, the guide piece 39 corresponds to the coupling half 42 of the previous exemplary embodiment.

The coupling 36 in accordance with FIG. 7 makes it possible to position the pull rod arrangement automatically in the guide rails 20, 21, and to thread the actuating elements 22 independently into the guide rails 20, 21 afterward or before. As soon as both elements have been positioned in the correct way, the guide piece 83 is pushed in the direction toward the actuating element 22 over the hooks 80, 81, which are compressed by this action. At the completion of the push, the hooks 80, 81 spring back into their initial position and are hooked on the rear of the guide piece 83. With this, the coupling 36 is engaged and is capable of transmitting pulling and pushing forces from the actuating element 22 to the pull rod arrangement 17.

From the foregoing, it can be seen that the motor vehicle window shade of the present invention has a pull rod arrangement which, by means of actuating elements running through the guide rails, is moved in a positive manner away from the winding shaft as well as toward it. To this end, a positively acting coupling is provided between the pull rod arrangement and the respective actuating element.

What is claimed is:

1. A window shade (12) for motor vehicles comprising:
   a rotatably seated winding shaft (16),
   a window shade web (13) fastened at one edge to the winding shaft (16),
   a guide which extends at least for some distance laterally next to the extended window shade web (13) and which has at least one guide groove (33),
   a pull rod arrangement (17) connected with the window shade web (13) at a location remote from the winding shaft (16), said pull rod arrangement (17) having a guide body (39) at one end which is guided in said at least one guide groove (33),
   a bendable, linearly extending, actuating element (22) moveable in said guide groove (33),
   a coupling (36) with two coupling halves (41, 42), one said coupling half being connected to said guide body (39) and the other said coupling half being connected to said actuator (22), said coupling halves (41, 42) being selectively coupleable together at least once, and
   a drive mechanism (18, 27) for displacing the actuating element (22) along said guide rail (20, 21) for rotating the winding shaft (16).

2. The window shade in accordance with claim 1 in which said coupling halves (41, 42) are repeatedly engageable and disengageable with each other.

3. The window shade in accordance with claim 1 in which said one coupling half (41) is longitudinally displaceable in said a guide rail (20, 21), and said other coupling half is at least partially moveable laterally to said guide rail.

4. The window shade in accordance with claim 1 in which said coupling halves are coupleable as an incident to movement of a cranking mechanism (46, 52, 58).

5. The window shade in accordance with claim 4 in which said crank mechanism (46, 52, 58) includes a control shoulder (58).

6. The window shade in accordance with claim 1 including a control shoulder (58) is defined by an opening (57) in the guide groove (33).

7. The window shade in accordance with claim 1 in which said coupling halves (41, 42) are hook shaped, and each coupling half (41, 42) having a coupling face (46, 52) which is obliquely inclined with respect to linear movement of the actuating element (22) along said guide groove such that a force component is created by pulling one of said coupling halves, which tends to separate the coupling halves (41, 42).

8. The window shade in accordance with claim 1 in which one of the said coupling halves (41, 42) have control faces (44, 49) that are engageable with each other as an incident to the two halves (41, 42) being forced together.

9. The window shade in accordance with claim 1 in which said coupling halves (41, 42) are hook shaped and each coupling half (41, 42) has a coupling face (62, 75) which is obliquely inclined with respect to linear movement of the actuating element (22) such that a force component is created by pushing one of the coupling halves which tends to engage the coupling halves (41, 42).

10. The window shade in accordance with claim 1 in which one of the coupling halves (42) has a stationary control face (79) and a functionally associated control face (64) which disengage the coupling halves (41, 42) as an incident to the halves being moved away from each other.

11. The window shade in accordance with claim 1 in which said actuating element (22) has an end remote from the coupling (36) that is connected to said drive mechanism (8, 27).

12. The window shade in accordance with claim 1 in which movement of said actuating element effects coupling of said coupling halves (41, 42).

13. The window shade in accordance with claim 1 in which said coupling halves (41, 42) are coupleable by a snap-in connection that permits only a one-time snap-in.

14. The window shade in accordance with claim 1 in which said winding shaft (16) has a spring drive (18) which is prestressed for rotating said shaft (16) in a winding direction of the window shade web (13).

15. The window shade in accordance with claim 1 in which said guide (20, 21) comprises at least one guide rail in which the guide groove (33) is defined.

16. The window shade in accordance with claim 1 in which said guide (20, 21) includes two guide rails on opposite sides of the extended window shade web (13).

17. The window shade in accordance with claim 1 in which said pull rod arrangement (17) includes a center piece and two guide elements (19) which can be displaced in a telescope-like manner with respect to the center piece and each of which has a guide body (39) on an end thereof.

18. The window shade in accordance with claim 1 in which guide groove (33) is an undercut groove which defines a groove slit (34) having a width less than the width of the interior of the guide groove.

19. The window shade in accordance with claim 1 in which said actuating element (22) includes a core element

(28) and at least one rib (30) located on the core element (28) and extending helically about the core element (28).

20. A window shade (12) for motor vehicles comprising:
a rotatably seated winding shaft (16),
a window shade web (13) fastened at one edge to the winding shaft (16),
a guide which extends at least for some distance laterally next to the extended window shade web (13) and which has at least one guide groove (33),
a pull rod arrangement (17) connected with the window shade web (13) at a location remote from the winding shaft (16), said pull rod arrangement (17) having a guide body (39) at one end which is guided in said at least one guide groove (33),
a bendable, linearly extending, actuating element (22) moveable in said guide groove (33),
a coupling (36) with two coupling halves (41, 42), one said coupling half being connected to said guide body (39) and the other said coupling half being connected to said actuator (22), said coupling halves (41, 42) being selectively engageable as an incident to movement of said actuating element, and
a drive mechanism (18, 27) for displacing the actuating element (22) along said guide rail (20, 21) for rotating the winding shaft (16).

21. The window shade in accordance with claim 20 in which said coupling halves (41, 42) are selectively disengageable from each other in response to movement of said actuating element.

22. The window shade in accordance with claim 20 in which said coupling halves (41, 42) are selectively engageable in response to movement of the actuating element in one direction along said guide groove, and said coupling halves are selectively disengageable in response to movement of said actuating element in a direction opposite to said first direction.

23. The window shade in accordance with claim 20 in which said coupling halves are selectively engageable in response to movement of said guide body past a predetermined location in said guide groove.

24. The window shade in accordance with claim 20 in which said coupling halves are disengageable in response to movement of said guide body past a predetermined location in said guide groove.

* * * * *